(12) United States Patent
Im

(10) Patent No.: US 11,317,605 B2
(45) Date of Patent: May 3, 2022

(54) PET DRY ROOM AND TRAY USED THEREFOR

(71) Applicant: Hyung Gyu Im, Goyang (KR)

(72) Inventor: Hyung Gyu Im, Goyang (KR)

( * ) Notice: Subject to any disclaimer, the term of this patent is extended or adjusted under 35 U.S.C. 154(b) by 204 days.

(21) Appl. No.: 16/631,187

(22) PCT Filed: Jun. 8, 2018

(86) PCT No.: PCT/KR2018/006510
§ 371 (c)(1),
(2) Date: Jan. 15, 2020

(87) PCT Pub. No.: WO2019/017591
PCT Pub. Date: Jan. 24, 2019

(65) Prior Publication Data
US 2021/0000075 A1    Jan. 7, 2021

(30) Foreign Application Priority Data

Jul. 17, 2017   (KR) .......................... 10-2017-0090566

(51) Int. Cl.
*A01K 13/00*    (2006.01)
*A47K 10/48*    (2006.01)

(52) U.S. Cl.
CPC ............ *A01K 13/001* (2013.01); *A47K 10/48* (2013.01)

(58) Field of Classification Search
CPC ...... A01K 1/001; A01K 1/003; A01K 13/001; A01K 13/003; A47K 10/48; A61D 7/00; A61D 11/00
USPC .......................... 119/600, 665, 671, 677, 678
See application file for complete search history.

(56) References Cited

U.S. PATENT DOCUMENTS

| | | | | | |
|---|---|---|---|---|---|
| 1,273,311 | A | * | 7/1918 | Barnes | A01K 13/003 119/667 |
| 3,175,534 | A | * | 3/1965 | Pollard | A01K 13/001 119/174 |
| 4,184,454 | A | * | 1/1980 | Nagao | A01K 13/001 119/678 |

(Continued)

FOREIGN PATENT DOCUMENTS

| JP | 06-046705 A | 2/1994 |
|---|---|---|
| KR | 10-2008-0068977 A | 7/2008 |

(Continued)

OTHER PUBLICATIONS

International Search Report for PCT/KR2018/006510 dated Sep. 11, 2018.

*Primary Examiner* — Ebony E Evans

(57) ABSTRACT

The present disclosure relates to a pet dry room and a tray used therefor, the pet dry room including: a body having an accommodation space for accommodating a pet therein; a door connected to a front surface of the body and configured to seal or open the accommodation space; and an air circulation module including a motor, a fan, a flow path, a nozzle, and a heater so as to spray and circulate air into the accommodation space, wherein air sprayed from a plurality of spray holes of a combined defecation plate and air spray tray installed on a bottom surface of the accommodation space and nozzles formed on a side surface and a rear surface of the accommodation space is suctioned into a first inlet port positioned on a front side of a ceiling surface of the accommodation space.

5 Claims, 8 Drawing Sheets

(56) References Cited

U.S. PATENT DOCUMENTS

| | | | | |
|---|---|---|---|---|
| 4,480,586 | A * | 11/1984 | Lague | A01K 13/001 |
| | | | | 119/420 |
| 4,510,889 | A * | 4/1985 | Jobe | A01K 13/003 |
| | | | | 119/669 |
| 4,559,903 | A * | 12/1985 | Bloom | A01K 13/001 |
| | | | | 119/416 |
| 5,724,918 | A * | 3/1998 | Navalon-Chicote | |
| | | | | A01K 13/001 |
| | | | | 119/668 |
| 6,435,136 | B1 * | 8/2002 | Segura Munoz | A01K 13/001 |
| | | | | 119/650 |
| 7,497,188 | B2 * | 3/2009 | Cho | A01K 13/001 |
| | | | | 119/604 |
| 8,186,307 | B2 * | 5/2012 | Moharram | A01K 13/001 |
| | | | | 119/651 |
| 9,451,758 | B2 * | 9/2016 | Kaneda | A01K 13/001 |

FOREIGN PATENT DOCUMENTS

| | | |
|---|---|---|
| KR | 20-0472302 B | 4/2014 |
| KR | 10-1579033 B | 12/2015 |
| KR | 10-1609559 B | 4/2016 |
| KR | 10-1672185 B | 11/2016 |

\* cited by examiner

PET DRY ROOM AND TRAY USED THEREFOR

CROSS REFERENCE TO RELATED APPLICATIONS

This application claims priority to Korean Patent Application No. 10-2017-0090566, filed on Jul. 17, 2017. Further, the application is the National Phase application of International Application No. PCT/KR2018/006510, filed on Jun. 8, 2018, which designates the United States. Each of these applications is hereby incorporated by reference in their entirety into the present application.

TECHNICAL FIELD

The present disclosure relates to a pet dry room and a tray used therefor, and more particularly, a pet dry room for drying the hair of a pet such as a dog or cat after bathing the pet or efficiently removing various foreign matters on the hair of a pet with strong wind after outdoor activity, and a tray used therefor.

BACKGROUND ART

Recently, with the growth of detached households and the population aging, more and more households raise pets such as dogs or cats in order to get emotional comfort through communion with the pets.

In many cases, people live with pets indoor even in single houses as well as apartments. In this case, foreign materials or contaminated hair of the pets may have a serious influence on human health. Thus, special attention is required for hygiene and cleanliness of the pets.

In order to maintain cleanliness of a pet, the owner of the pet requests a pet shop to bathe the pet or bathes the pet in person. In this case, when the hair of the pet is not dried well after the bath, the pet may catch a cold or a skin disease.

When a general hair dryer or a pet dryer placed on a holder is used to dry the hair of the pet, hair which falls out during the drying process cannot be collected, and it may take a long time to dry the hair of the pet.

In order to solve such a problem, a pet dry room has been developed and spread, which can accommodate a pet to dry the hair of the pet.

As illustrated in FIG. 1, Korean Patent Application Laid-Open No. 2008-0068977 discloses a pet dryer in which warm wind is sent downward along the inner wall surface of an accommodation space 1 having a pet accommodated therein, and moved upward while drying the hair of the pet. However, since such a structure cannot directly control the flow direction and intensity of the air in the accommodation space, the structure cannot control the flow direction and intensity of the air according to the posture of the pet and the length of the hair, and thus has low drying efficiency.

As illustrated in FIG. 2, Korean Patent No. 1609559 discloses a pet carrier with a dry room function, in which warm wind can be supplied from a bottom surface 2 and a side surface 3, in order to raise drying efficiency. When warm wind is supplied from the bottom surface 2 and the side surface 3, excellent drying efficiency may be acquired. However, since the pet carrier has a bag shape, the pet carrier is not suitable for being used for a large pet, and a wall structure constituting the bottom surface 2 is filled with a mesh net and thus weakens an air flow. When a pet pees and poops in the pet carrier, the wall structure of the bottom surface and the carrier may be contaminated.

As illustrated in FIG. 3, Korean Patent No. 1672185 discloses a pet dryer in which nozzles 4 are arranged to supply warm wind from a ceiling surface and a side surface of an accommodation space in consideration of the posture of a pet or the like. In such a structure, the largest amount of warm wind is supplied from an upper region on the front side, and an air flow is formed toward the rear side. In this case, the air in the upper region on the front side, where the head of a pet is positioned, becomes high-temperature dry air. Therefore, when the dryer is used for a long time, the high-temperature dry air may have a harmful influence on the respiratory organ of the pet.

DISCLOSURE

Technical Problem

Various embodiments are directed to a pet dry room which supplies air into an accommodation space through the side and rear of a pet and then discharges the air to the outside of the accommodation space on the front side of a ceiling surface, such that the hair of the pet is erected and dried, thereby increasing the drying efficiency, and a tray used therefor.

Also, various embodiments are directed to a pet dry room which sprays warm air from a bottom surface such that the belly or rump of the pet is well dried even while the pet is sitting or lying down, and prevents a bottom surface from being contaminated by water flowing from wet hair or urine of the pet, and a tray used therefor.

Further, various embodiments are directed to a pet dry room which can improve the durability of a product by preventing a breakdown of an air circulation module, and keep surrounding air clean to secure comfortable atmosphere, and a tray used therefor.

Technical Solution

In an embodiment, a pet dry room may include: a body having an accommodation space for accommodating a pet therein; a door connected to a front surface of the body and configured to seal or open the accommodation space; and an air circulation module including a motor, a fan, a flow path, a nozzle, and a heater so as to spray and circulate air into the accommodation space, wherein air sprayed from a plurality of spray holes of a combined defecation plate and air spray tray installed on a bottom surface of the accommodation space and nozzles formed on a side surface and a rear surface of the accommodation space is suctioned into a first inlet port positioned on a front side of a ceiling surface of the accommodation space.

The combined defecation plate and air spray may include a tray body configured as a container, a foothold mounted on the top of the tray body and having the plurality of spray holes, and a connection part disposed at a higher position than the foothold, connected to a first outlet port formed on the rear surface of the accommodation space, and configured to supply air into the tray body.

A second inlet port for supplying external air to the air circulation module may be located on a top side of the outer surface of the pet dry room, and a second outlet port for discharging the air within the accommodation space to the outside may be installed on the door.

Each of the first and second inlet ports and the second outlet port may have a replaceable or washable filter.

The nozzles on the side surface may be arranged according to the shape of a pet facing the door, and the nozzles on the side surface and the rear surface may be integrated with a side wall structure and a rear wall structure, which constitute the accommodation space.

Advantageous Effects

In accordance with the embodiment of the present disclosure, the pet dry room can dry the hair of a pet while forming an air flow in the reverse direction to the grain direction of the hair of the pet, and thus improve the drying efficiency. Furthermore, after the hair of the pet is dried, the appearance of the pet may be kept elegant. Furthermore, since the pet dry room can spray warm wind from the bottom surface, the belly or rump of the pet may be well dried even while the pet is sitting or lying down. Furthermore, although the pet pees and poops in the accommodation space while the hair of the pet is dried, the accommodation space can be kept clean.

Furthermore, since the pet dry room can filter foreign matters or the hair of a pet through the filters of the inlet port and the outlet port, the pet dry room can prevent a breakdown of the air circulation module and keep the surrounding air clean.

MODE FOR INVENTION

Hereafter, the present disclosure will be described in more detail through embodiments with reference to the drawings.

Figure 1:
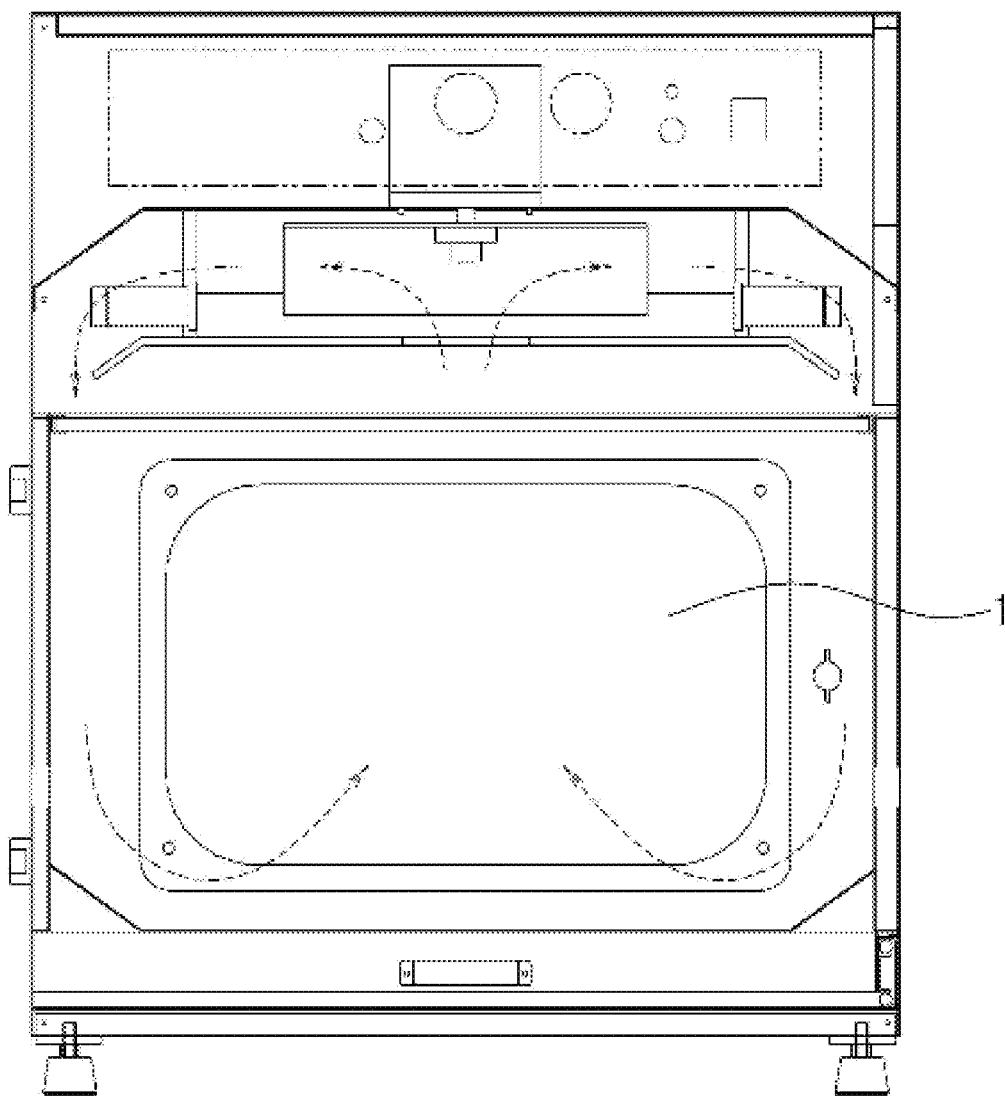
FIGS. 1 to 3 are views for describing the related art.
Figure 2:
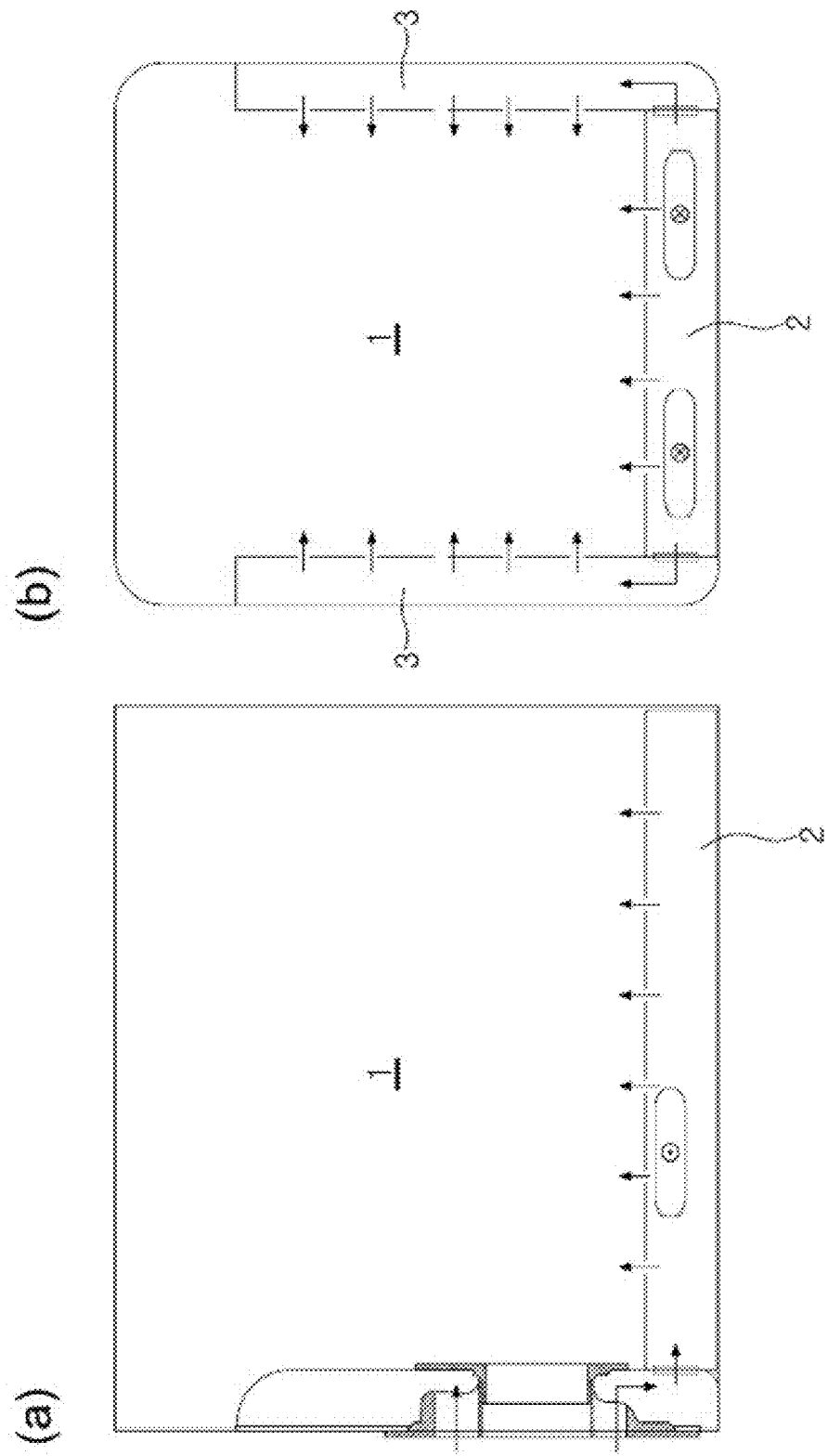
Figure 3:
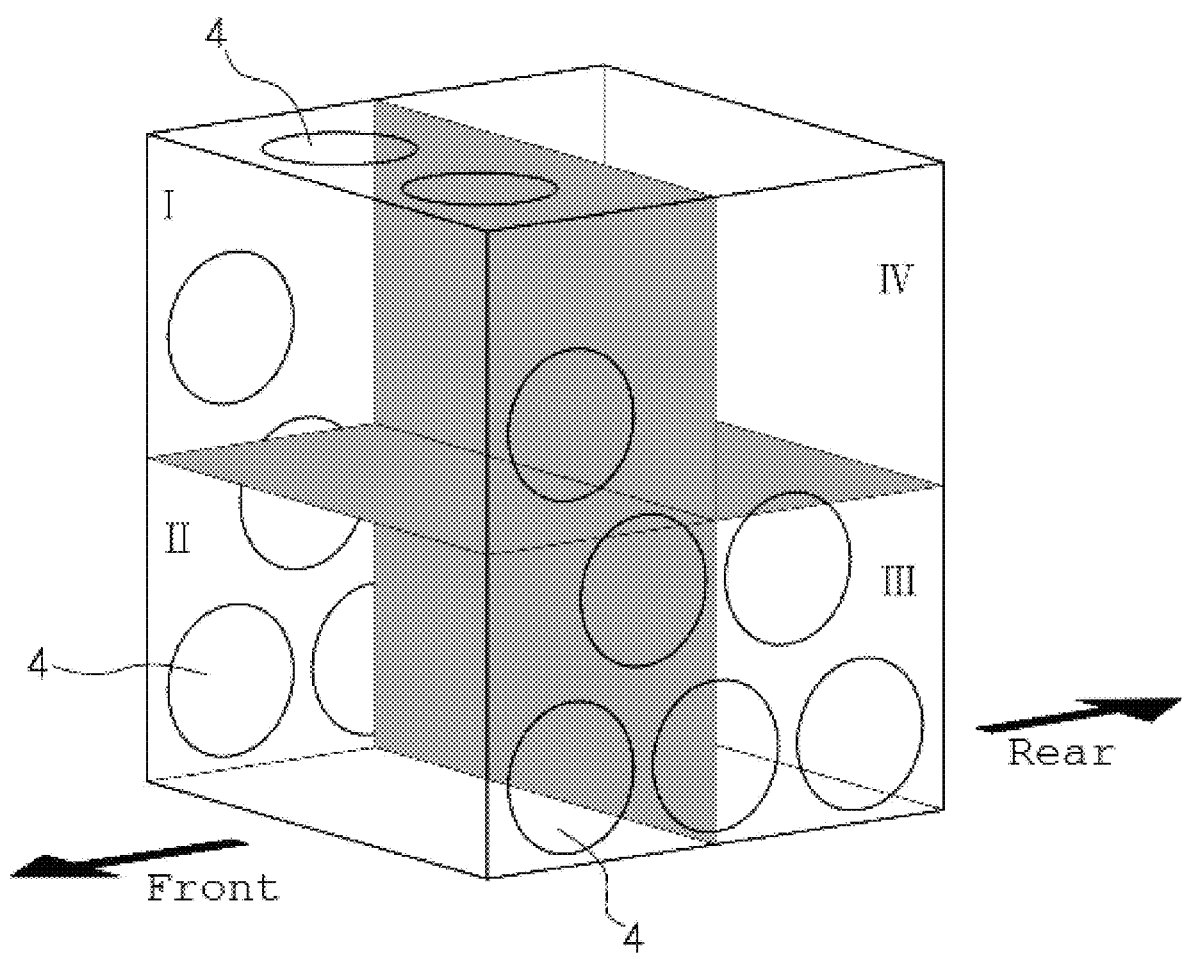
Figure 4:
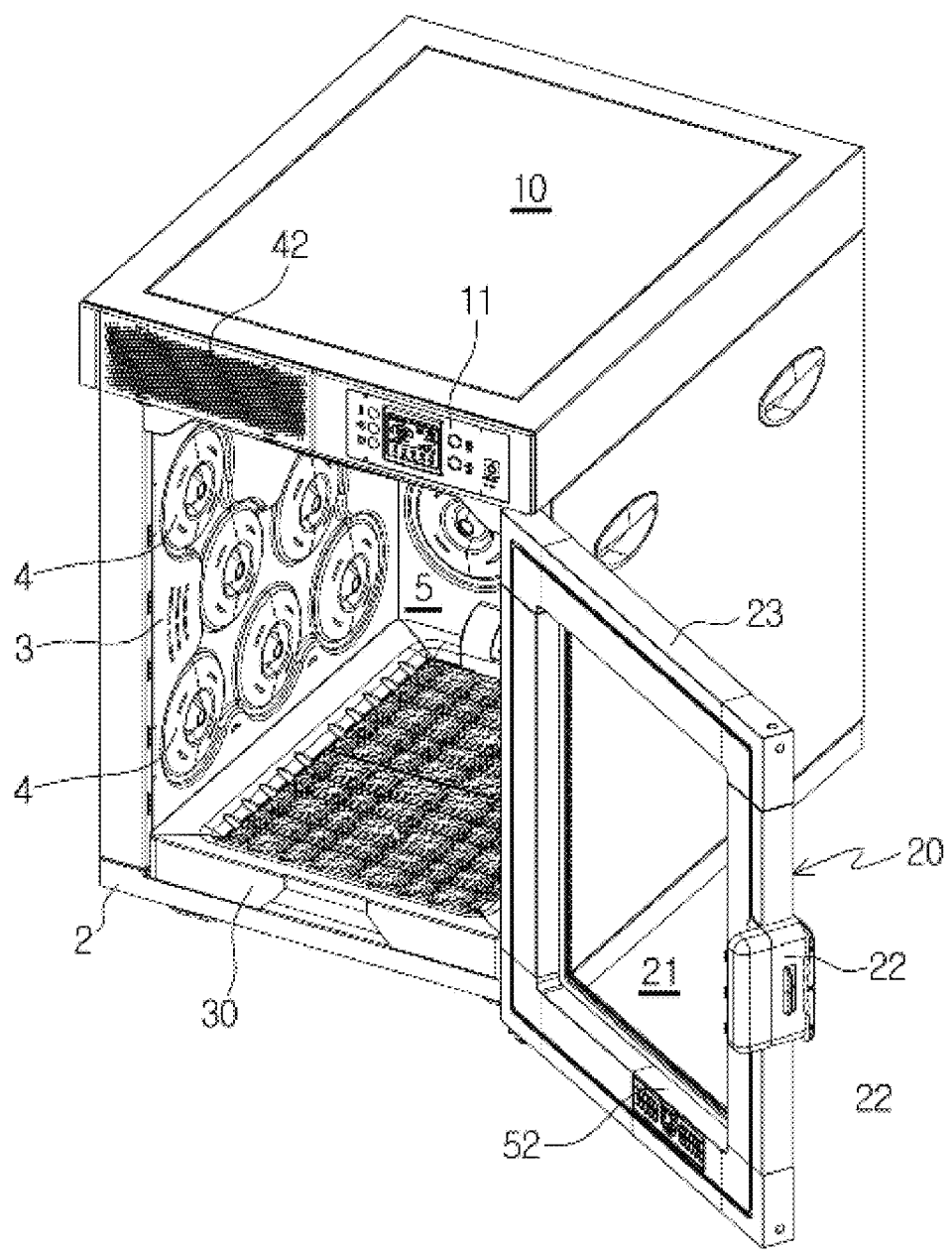
FIGS. 4 and 5 are perspective views illustrating a pet dry room in accordance with an embodiment of the present disclosure.
Figure 5:
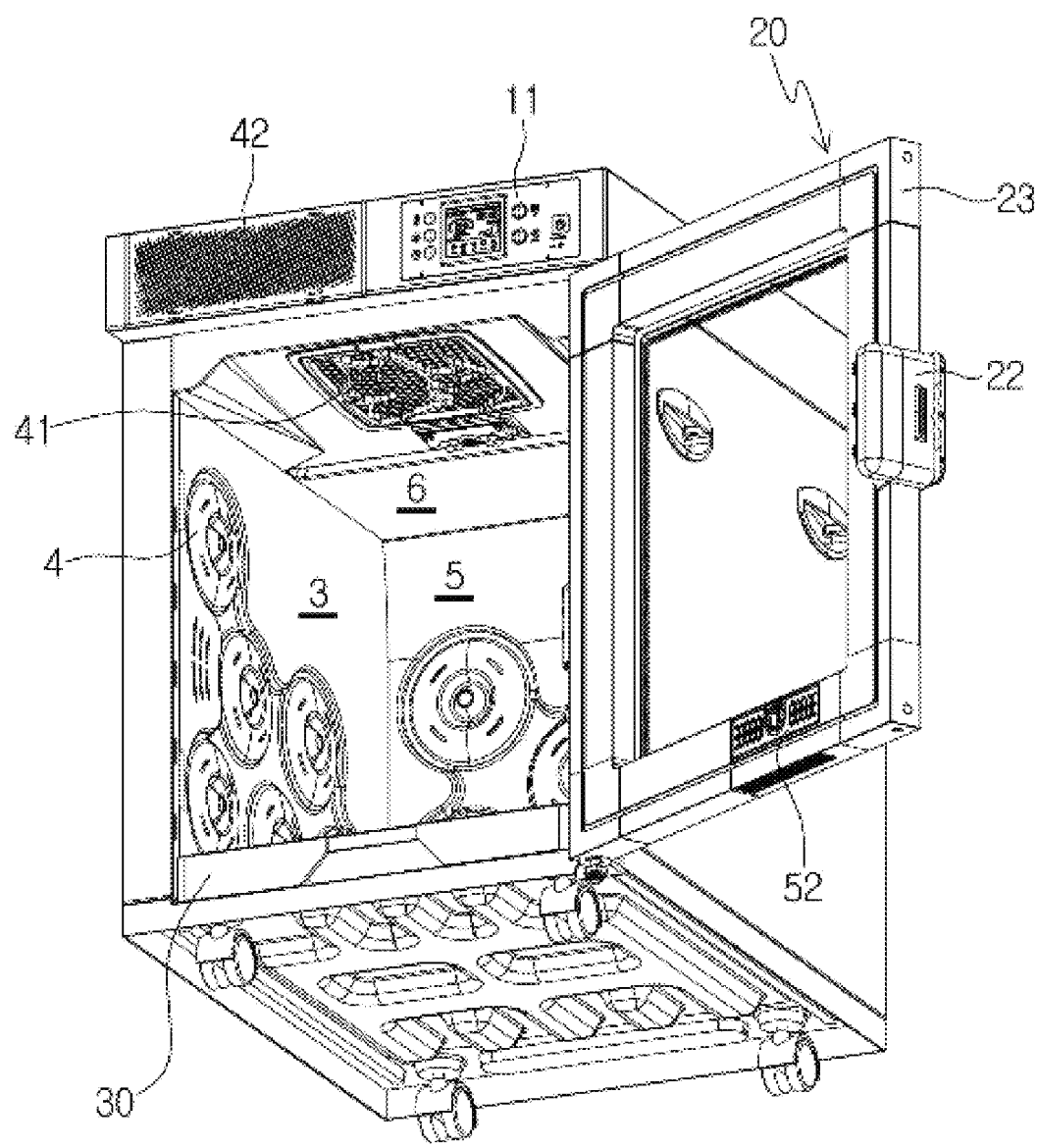

FIGS. 4 and 5 are perspective views illustrating the exterior of a pet dry room in accordance with an embodiment of the present disclosure.

The pet dry room includes a body 10 having an accommodation space 1 for accommodating a pet therein and a door 20 connected to a front surface of the body 10 so as to seal or open the accommodation space 1. The body 10 has a second inlet port 42 and a control panel 11 which are formed at the top of the front surface thereof. The second inlet port 42 serves to supply external air into the accommodation space 1, and the control panel 11 serves to control the amount, temperature and time of air to be supplied into the accommodation space 1.

The accommodation space 1 is formed as a space surrounded by a bottom surface 2, a side surface 3, a rear surface 5 and a ceiling surface 6, and includes nozzles 4 arranged on the side surface 3 and the rear surface 5 so as to spray air into the accommodation space and a first inlet port 41 installed on a front side of the ceiling surface 6 so as to suction the air within the accommodation space. A combined defecation plate and air spray tray 30 is mounted on the bottom surface 2.

Figure 6:
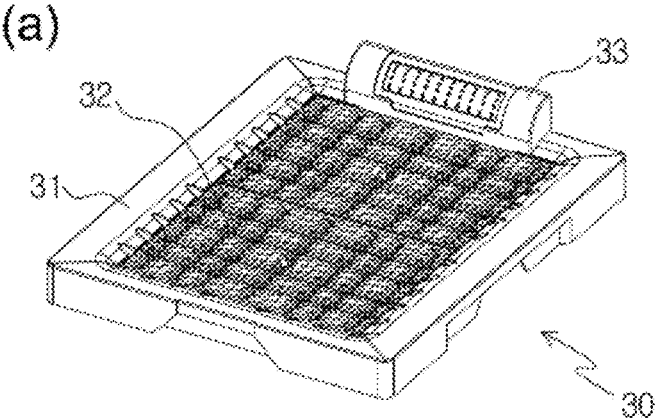
FIG. 6A to 6C are views illustrating a combined defecation plate and air spray tray in accordance with an embodiment of the present disclosure.
Figure 6:
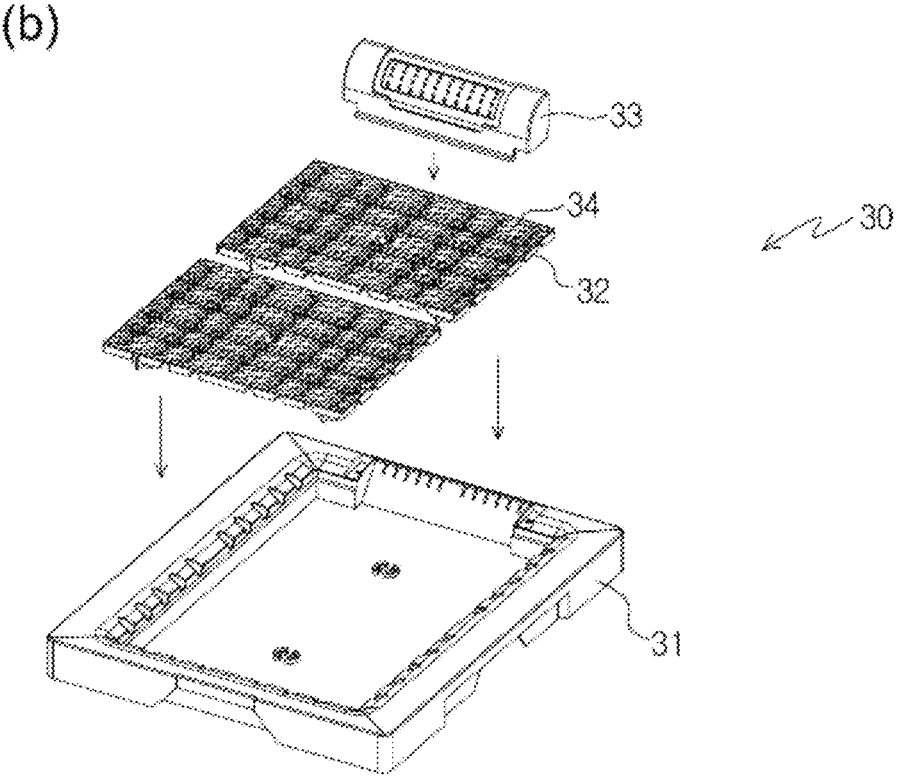
Figure 6:
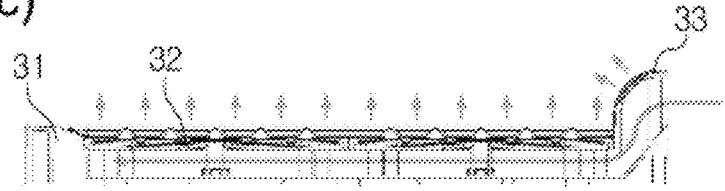

The combined defecation plate and air spray tray 30 illustrated in FIG. 6 includes a tray body 31, a foothold 32, and a connection part 33. The foothold 32 is mounted on the top of the tray body 31 such that a pet stands on the foothold 32, and has a plurality of spray holes 34. The connection part 33 is disposed at a higher position than the foothold 32, and connected to a first outlet port 51 on the rear surface 5 of the accommodation space so as to supply air into the tray body 31. The air introduced into the connection part 33 is passed through the tray body 31 and then sprayed into the accommodation space 1 through the spray holes 34 of the foothold 32.

The tray body 31 is formed in the shape of a container capable of containing water or urine flowing from wet hair of the pet in the accommodation space 1. The foothold 32 and the connection part 33 may be detachably assembled into the tray body 31, which makes it easy for a user to wash the tray body 31. The reason why the connection part 33 needs to be disposed at a higher position than the foothold 32 is in order to prevent water or urine of the tray body 31 from flowing into the first outlet port 51.

When a pet is accommodated in the accommodation space 1, the pet sits or stands toward the door 20 having a transparent window 21 installed thereon due to its attributes.

Figure 7:
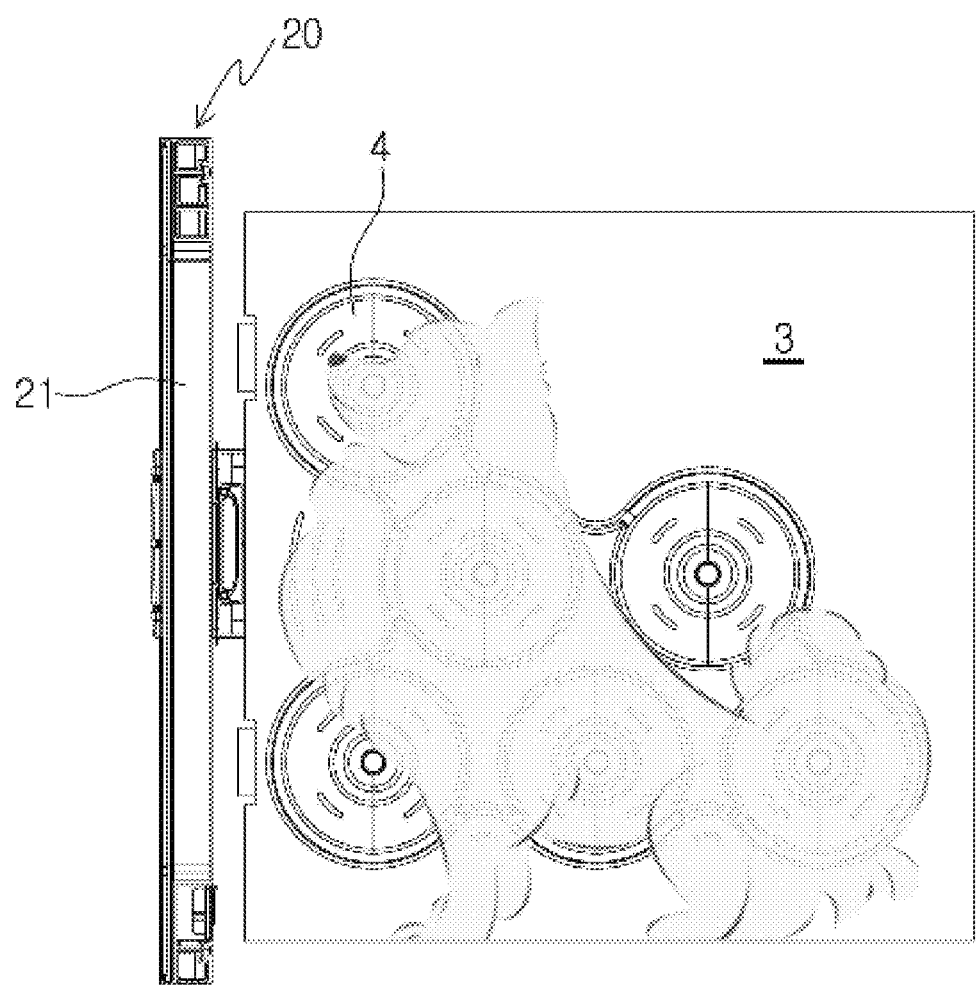
FIG. 7 is a view illustrating an arrangement of side nozzles.

As illustrated in FIG. 7, the nozzles 4 on the side surface 3 are arranged according to the shape of the pet toward the door 20. That is, when the side surface is divided into front and rear parts, the nozzles are arranged in such a manner that the amount of air sent from the front part is larger than the amount of air sent from the rear part and the amount of air sent from the lower side of the rear part is larger than the amount of air sent from the upper side of the rear part. Through the arrangement of the nozzles, the air can be sprayed onto the body of the pet. Therefore, the drying and cleaning effect can be improved, and nozzles corresponding to unnecessary parts do not need to be closed or controlled. Therefore, the side surface 3 and the nozzles 4 can be manufactured as a single body, which makes it possible to reduce the manufacturing cost.

Figure 8:
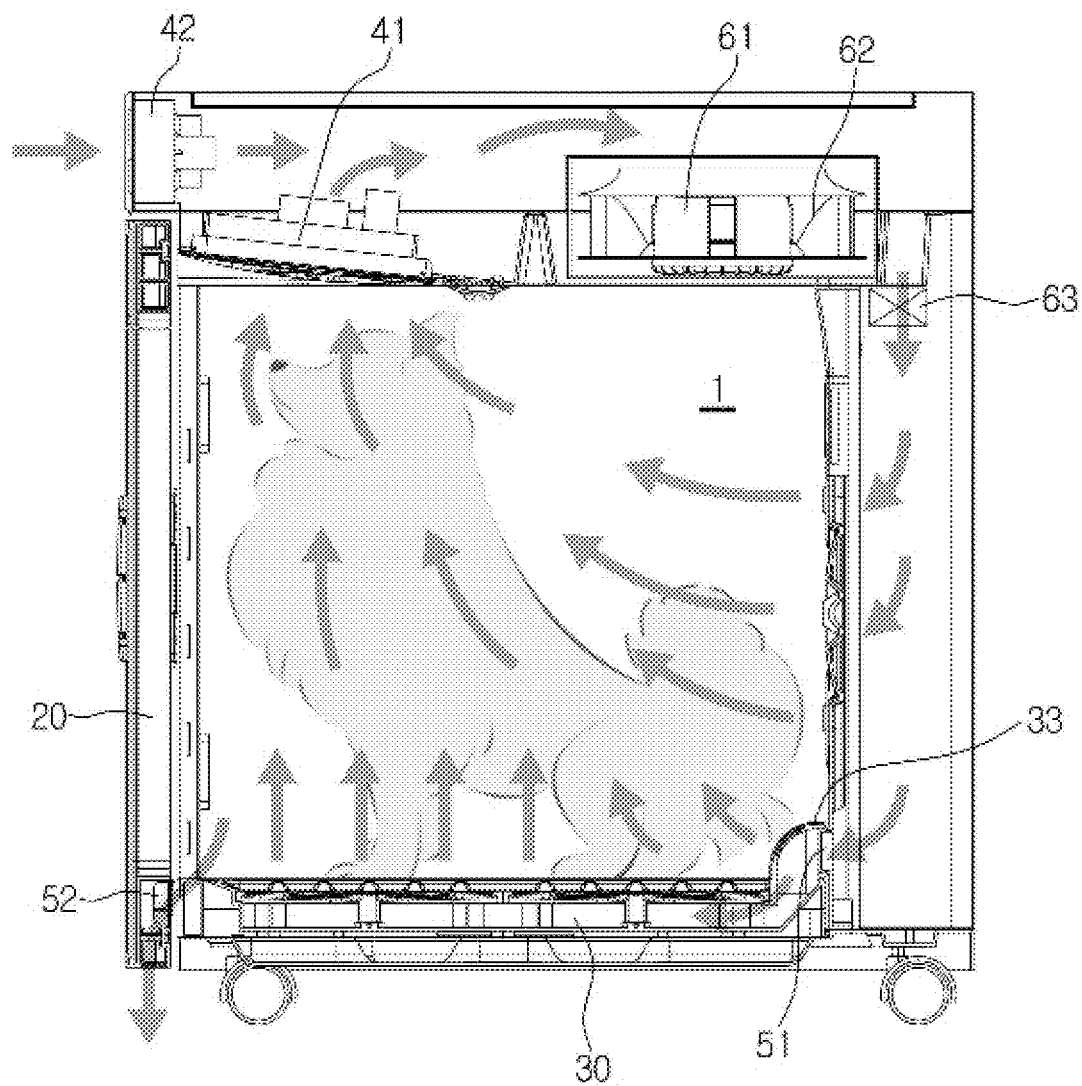
FIG. 8 is a view illustrating air circulations in accordance with the embodiment of the present disclosure.

FIG. 8 illustrates air flows formed in the pet dry room by an air circulation module, but does not illustrate air flows by the nozzles on the side surface.

A motor 61 and a fan 62 are positioned at the top of the accommodation space 1, and serve to discharge or suction air into or from the accommodation space 1, and a heater 63 serves to heat the air supplied into the accommodation space 1. A flow path is formed between the wall structure constituting the accommodation space and a wall structure constituting an outer wall of the pet dry room, and the nozzles 4 are formed on the side surface 3 and the rear surface 5 of the accommodation space 1. Through the nozzles 4 and the spray holes 34 of the above-described combined defecation plate and air spray tray 30, the air is sprayed into the accommodation space 1.

Even when the wet hair of the pet is to be dried, hot wind needs to be supplied. However, when dust or foreign matters are to be removed, the air does not need to be heated.

The air, which is suctioned into the second inlet port 42 disposed on the top side of the outer surface of the pet dry room so as to suction external air and the first inlet port 41 disposed on the front side of the ceiling surface 6 of the accommodation space 1 so as to suction the air within the accommodation space 1, is moved along the flow path by the motor 61 and the fan 62, and then sprayed into the accommodation space 1 through the nozzles 4 on the side surface 3 and the rear surface 5 and the spray holes 34 of the combined defecation plate and air spray tray 30. The air sprayed through the nozzles 4 and the spray holes 34 dries the hair of the pet, and is then introduced into the first inlet port 41 disposed on the front side of the ceiling surface 6 of the accommodation space 1.

Such an air flow within the accommodation space 1, i.e. the air flow from rear to front and from bottom to top, is formed in the reverse direction to the grain direction of the hair of the pet facing the door at the front. Thus, the hot wind can be supplied deeply into the hair, and the hair can be effectively dried. Furthermore, since the air flowing along the head of the pet, positioned on the upper side of the front part, contains moisture removed along the body of the pet, the air does not make the respiratory organ of the pet dry.

A part of the air flowing in the accommodation space 1 is discharged to the outside through a second outlet port 52 installed at the bottom of the door 20.

The introduction of the external air or the discharge of the air to the outside may be blocked, if necessary. This process may be performed by closing the second inlet port 42 and/or the second outlet port 52.

In order to prevent foreign matters from the outside from flowing into the pet dry room and to prevent hair or foreign matters within the accommodation space 1 from leaking to the motor or fan or the outside, the first and second inlet ports 41 and 42 and the second outlet port 52 may have a replaceable or washable filter installed therein. When a cartridge (not illustrated) for producing aroma scents or oxygen is further installed at the second inlet port 42 to which the external air is supplied, the pet within the closed accommodation space may have emotional stability.

Furthermore, an LED lighting may be installed in the accommodation space 1 in order to observe the pet more reliably. When far-infrared light is emitted, the blood circulation of the pet may be promoted to contribute to hair care.

While various embodiments have been described above, it will be understood to those skilled in the art that the embodiments described are by way of example only. Accordingly, the disclosure described herein should not be limited based on the described embodiments.

The invention claimed is:

1. A pet dry room comprising:
   a body having an accommodation space for accommodating a pet therein;
   a door connected to a front surface of the body and configured to seal or open the accommodation space; and
   an air circulation module including a motor, a fan, a flow path, a nozzle, and a heater so as to spray and circulate air into the accommodation space,
   wherein air sprayed from a plurality of spray holes of a combined defecation plate and air spray tray installed on a bottom surface of the accommodation space and nozzles formed on a side surface and a rear surface of the accommodation space is suctioned into a first inlet port positioned on a front side of a ceiling surface of the accommodation space, and
   wherein the combined defecation plate and air spray comprises a tray body configured as a container, a foothold mounted on the top of the tray body and having the plurality of spray holes, and a connection part disposed at a higher position than the foothold, connected to a first outlet port formed on the rear surface of the accommodation space, and configured to supply air into the tray body.

2. The pet dry room of claim 1, wherein a second inlet port for supplying external air to the air circulation module is located on a top side of the outer surface of the pet dry room, and a second outlet port for discharging the air within the accommodation space to the outside is installed on the door.

3. The pet dry room of claim 2, wherein each of the first and second inlet ports and the second outlet port has a replaceable or washable filter.

4. The pet dry room of claim 1, wherein the nozzles on the side surface are arranged according to the shape of a pet facing the door, and the nozzles on the side surface and the rear surface are integrated with a side wall structure and a rear wall structure, which constitute the accommodation space.

5. A tray used for a pet dry room which includes:
   a body having an accommodation space for accommodating a pet therein;
   a door connected to a front surface of the body to seal or open the accommodation space;
   an air circulation module formed to include a motor, a fan, a flow path, a nozzle, and a heater so as to spray and circulate air into the accommodation space,
   the tray comprising:
   a tray body configured as a container;
   a foothold mounted on the top of the tray body and having a plurality of spray holes; and
   a connection part disposed at a higher position than the foothold, connected to an outlet port formed on a rear surface of the accommodation space, and configured to supply air into the tray body.

* * * * *